US012659316B2

(12) United States Patent
    Sodah

(10) Patent No.:     US 12,659,316 B2
(45) Date of Patent:         Jun. 16, 2026

---

(54) MEDIA USAGE MONITORING AND CONTROL

(71) Applicant: Comcast Cable Communications, LLC, Philadelphia, PA (US)

(72) Inventor: Sunil Sodah, San Francisco, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/441,204

(22) Filed: Jun. 14, 2019

(65)              Prior Publication Data

US 2020/0036718 A1          Jan. 30, 2020

Related U.S. Application Data

(63) Continuation of application No. 13/150,981, filed on Jun. 1, 2011, now abandoned.

(51) Int. Cl.
    *H04L 9/40*          (2022.01)
    *G06F 21/62*          (2013.01)

(52) U.S. Cl.
    CPC ........ *H04L 63/102* (2013.01); *G06F 21/6218* (2013.01); *G06F 2221/2149* (2013.01); *H04L 63/20* (2013.01)

(58) Field of Classification Search
    CPC .... H04L 63/102; H04L 63/20; G06F 21/6218
    See application file for complete search history.

(56)              References Cited

U.S. PATENT DOCUMENTS

| | | |
|---|---|---|
| 7,231,450 B1 | 6/2007 | Clifford et al. |
| 7,380,135 B2 | 5/2008 | Nishimoto et al. |

| | | |
|---|---|---|
| 7,565,529 B2 | 7/2009 | Beck et al. |
| 7,954,136 B2 | 5/2011 | Fascenda |
| 8,024,225 B1 | 9/2011 | Sirota et al. |
| 8,085,808 B2 | 12/2011 | Brusca et al. |
| 8,312,484 B1 | 11/2012 | McCarty et al. |
| 8,347,362 B2 | 1/2013 | Cai et al. |
| 8,387,118 B2 | 2/2013 | Zubas et al. |
| 8,438,184 B1 | 5/2013 | Wang et al. |
| 8,621,056 B2 | 12/2013 | Coussemaeker et al. |
| 8,688,971 B2 | 4/2014 | Ichinose et al. |

(Continued)

FOREIGN PATENT DOCUMENTS

| | | |
|---|---|---|
| CN | 101958878 A | 1/2011 |
| EP | 1940079 A1 | 7/2008 |
| EP | 2993927 A1 | 3/2016 |

OTHER PUBLICATIONS

Wardhana, S.; Sabariah, M.K.; Effendy, V.; Kusumo, D.S.; "User interface design model for parental control application on mobile smartphone using user centered design method," 5th International Conference on Information and Communication Technology (ICoIC7), Melaka, Malaysia, May 17-19, 2017, IEEE, 6 pages.*

(Continued)

*Primary Examiner* — Victor Lesniewski

(74) *Attorney, Agent, or Firm* — Banner & Witcoff, Ltd.

(57)              ABSTRACT

Systems and methods of monitoring access to media content across disparate media devices are disclosed. Aspects relate to systems and methods that may be implemented to control access to media content. In one embodiment, rules may define usage parameters of a user for several types of media content and/or disparate media devices.

22 Claims, 4 Drawing Sheets

(56) References Cited

U.S. PATENT DOCUMENTS

| | | | |
|---|---|---|---|
| 8,706,864 | B1 | 4/2014 | Brandwine et al. |
| 8,898,303 | B2 | 11/2014 | McGowan et al. |
| 9,251,519 | B1 | 2/2016 | Bharat et al. |
| 9,405,813 | B1 | 8/2016 | Qian et al. |
| 9,419,852 | B1 | 8/2016 | Heller et al. |
| 10,091,312 | B1 | 10/2018 | Khanwalkar et al. |
| 10,404,532 | B2 | 9/2019 | Ramasubramani et al. |
| 10,992,678 | B1 | 4/2021 | Gilman |
| 2003/0014518 | A1 | 1/2003 | Richard |
| 2003/0018889 | A1 | 1/2003 | Burnett et al. |
| 2003/0028622 | A1* | 2/2003 | Inoue ................. H04N 21/8355 |
| | | | 709/219 |
| 2004/0003279 | A1* | 1/2004 | Beilinson .............. G06F 21/604 |
| | | | 726/7 |
| 2005/0075115 | A1 | 4/2005 | Corneille et al. |
| 2005/0166065 | A1 | 7/2005 | Eytchison et al. |
| 2006/0265507 | A1 | 11/2006 | Banga et al. |
| 2006/0272014 | A1 | 11/2006 | McRae et al. |
| 2006/0293057 | A1* | 12/2006 | Mazerski .............. H04M 3/436 |
| | | | 455/445 |
| 2007/0124785 | A1* | 5/2007 | Marsico ............. H04N 21/6405 |
| | | | 725/105 |
| 2007/0150918 | A1* | 6/2007 | Carpenter ............... G06F 21/10 |
| | | | 348/E7.061 |
| 2007/0201508 | A1 | 8/2007 | Blackford et al. |
| 2007/0283011 | A1 | 12/2007 | Rakowski et al. |
| 2008/0016196 | A1* | 1/2008 | MacMillan ............. H04L 43/00 |
| | | | 709/223 |
| 2008/0049767 | A1* | 2/2008 | Koltenuk .............. H04L 63/102 |
| | | | 370/401 |
| 2008/0126286 | A1 | 5/2008 | Machani |
| 2008/0141293 | A1* | 6/2008 | Blanchard .......... H04N 21/4532 |
| | | | 725/28 |
| 2008/0222707 | A1 | 9/2008 | Pathuri et al. |
| 2008/0250484 | A1* | 10/2008 | Chong ................ H04L 63/0245 |
| | | | 726/7 |
| 2008/0256641 | A1* | 10/2008 | Lo ............................ G06F 21/62 |
| | | | 726/26 |
| 2008/0307339 | A1* | 12/2008 | Boro ........................ H04L 63/08 |
| | | | 715/764 |
| 2009/0089826 | A1* | 4/2009 | Card, II ............. H04N 21/4542 |
| | | | 725/25 |
| 2009/0113039 | A1 | 4/2009 | Savoor et al. |
| 2009/0151006 | A1 | 6/2009 | Saeki et al. |
| 2009/0201830 | A1 | 8/2009 | Angelot et al. |
| 2009/0254656 | A1 | 10/2009 | Vignisson et al. |
| 2010/0015926 | A1 | 1/2010 | Luff |
| 2010/0015956 | A1 | 1/2010 | Qu et al. |
| 2010/0100898 | A1 | 4/2010 | Pfleging et al. |
| 2010/0121744 | A1 | 5/2010 | Belz et al. |
| 2010/0162342 | A1 | 6/2010 | Piepenbrink et al. |
| 2010/0182983 | A1* | 7/2010 | Herscovici ............ H04W 24/00 |
| | | | 370/338 |
| 2010/0272057 | A1 | 10/2010 | Chen |
| 2010/0318628 | A1* | 12/2010 | Pacella ................. H04L 67/303 |
| | | | 709/228 |
| 2011/0004913 | A1 | 1/2011 | Nagarajan et al. |
| 2011/0010383 | A1 | 1/2011 | Thompson et al. |
| 2011/0045811 | A1 | 2/2011 | Kemery |
| 2011/0065419 | A1 | 3/2011 | Book et al. |
| 2011/0072039 | A1* | 3/2011 | Tayloe ..................... G06F 21/62 |
| | | | 707/769 |
| 2011/0072133 | A1* | 3/2011 | Sullivan .............. H04L 61/2015 |
| | | | 709/224 |
| 2011/0096728 | A1 | 4/2011 | Wu et al. |
| 2011/0119306 | A1 | 5/2011 | Patil |
| 2011/0131641 | A1* | 6/2011 | Zubas ..................... H04W 4/24 |
| | | | 709/224 |
| 2011/0138409 | A1* | 6/2011 | Svensson ........... H04N 21/4751 |
| | | | 725/25 |
| 2011/0185437 | A1 | 7/2011 | Tran et al. |
| 2011/0191859 | A1 | 8/2011 | Naslund et al. |
| 2011/0209206 | A1 | 8/2011 | Surpatanu et al. |
| 2011/0231898 | A1 | 9/2011 | Tovar |
| 2011/0283311 | A1 | 11/2011 | Luong |
| 2012/0071132 | A1 | 3/2012 | Carlander |
| 2012/0089699 | A1 | 4/2012 | Cholas |
| 2012/0143978 | A1 | 6/2012 | Coussemaeker et al. |
| 2012/0147769 | A1 | 6/2012 | Kalavade |
| 2012/0158969 | A1 | 6/2012 | Dempsky et al. |
| 2012/0198034 | A1 | 8/2012 | Avirneni et al. |
| 2012/0216222 | A1* | 8/2012 | Candelore .......... H04N 21/4542 |
| | | | 725/28 |
| 2012/0317224 | A1 | 12/2012 | Caldwell et al. |
| 2013/0013752 | A1 | 1/2013 | Herrera Van Der Nood et al. |
| 2013/0041909 | A1* | 2/2013 | Coleman ................. H04L 63/08 |
| | | | 707/758 |
| 2013/0054433 | A1 | 2/2013 | Giard et al. |
| 2013/0077526 | A1 | 3/2013 | Yasukawa et al. |
| 2013/0091279 | A1 | 4/2013 | Haddad et al. |
| 2013/0167196 | A1 | 6/2013 | Spencer et al. |
| 2013/0191901 | A1 | 7/2013 | Black |
| 2013/0265910 | A1 | 10/2013 | Hillen et al. |
| 2013/0268640 | A1 | 10/2013 | Wu et al. |
| 2014/0068030 | A1 | 3/2014 | Chambers et al. |
| 2014/0089661 | A1 | 3/2014 | Mahadik et al. |
| 2014/0115131 | A1 | 4/2014 | Zhu et al. |
| 2014/0119354 | A1 | 5/2014 | Verma et al. |
| 2014/0253944 | A1 | 9/2014 | Neville et al. |
| 2014/0282847 | A1 | 9/2014 | Blacka et al. |
| 2014/0317270 | A1 | 10/2014 | Besehanic et al. |
| 2014/0359170 | A1 | 12/2014 | Hutchings et al. |
| 2015/0074245 | A1 | 3/2015 | Ma et al. |
| 2015/0326594 | A1 | 11/2015 | Chari et al. |
| 2015/0341216 | A1 | 11/2015 | Cooppan |
| 2016/0006841 | A1 | 1/2016 | Gurevich et al. |
| 2016/0094645 | A1 | 3/2016 | Ashutosh et al. |
| 2016/0182402 | A1 | 6/2016 | Carames et al. |
| 2016/0248621 | A1 | 8/2016 | Oulahal et al. |
| 2016/0323387 | A1 | 11/2016 | Heller et al. |
| 2016/0350400 | A1 | 12/2016 | Zhu et al. |
| 2016/0352760 | A1 | 12/2016 | Mrkos et al. |
| 2017/0085529 | A1 | 3/2017 | Finkelstein |
| 2017/0238235 | A1 | 8/2017 | Keidar et al. |
| 2017/0245298 | A1 | 8/2017 | Demange et al. |
| 2017/0262523 | A1 | 9/2017 | Epstein et al. |
| 2017/0288965 | A1 | 10/2017 | Cebere |
| 2018/0013606 | A1 | 1/2018 | Wang et al. |
| 2018/0039766 | A1 | 2/2018 | Dai et al. |
| 2018/0270229 | A1 | 9/2018 | Zhang et al. |
| 2018/0270612 | A1 | 9/2018 | Thoresen et al. |
| 2018/0308111 | A1 | 10/2018 | Bigbee et al. |
| 2019/0387011 | A1 | 12/2019 | Du et al. |
| 2021/0234866 | A1* | 7/2021 | Michalowitz .... H04N 21/25883 |

OTHER PUBLICATIONS

European Extended Search report—App No. 16164653.4—dated Sep. 2, 2016.

Broadband Forum: "11TR-069 CPE WAN 1-15 Management Protocol"—Jul. 1, 2011—URL:http://www.broadband-forum. orgjtechnicaljdownload/TR-069 Amendment-4.pdf.

Jun. 25, 2019—European Office Action—16164653.4.

W. Wu, J. Wu, Y. Wang, Z. Ling and M. Yang, "Efficient Fingerprinting-Based Andriod Device Identification. With Zero-Permission Identifiers," in IEEE Access, vol. 4, pp. 8073-8083, 2016 (Year: 2016).

N. Ammar, L. Noirie and S. Tixeuil, "Network-Protocol-Based IoT Device Identification," 2019 Fourth International Conference on Fog and Mobile Edge Computing (FMEC), Rome, Italy, 2019, pp. 204-209 (Year: 2019).

K. Takeda, "User Identification and Tracking with online device fingerprints fusion," 2012 IEEE International Carnahan Conference on Security Technology (ICCST), Boston, MA, 2012, pp. 163-167 (Year: 2012).

Jul. 28, 2020—European Office Action—EP 16164653.4.

Tanaka, Takaaki, Shinichiro Moriwaki, and Kenichi Ooto. "Applying device discovery methods for home network management." 8th Asia-Pacific Symposium on Information and Telecommunication Technologies. IEEE, 2010. (Year: 2010).

(56)                    References Cited

OTHER PUBLICATIONS

Miettinen, Markus, et al. "Iot sentinel: Automated device-type identification for security enforcement in iot." 2017 IEEE 37th International Conference on Distributed Computing Systems (ICDCS). IEEE, 2017. (Year: 2017).

Braun, Lukas, and Hans-Joachim Hof. "Self-descriptive device message." 2017. (Year: 2017).

Dec. 14, 2020—Euroepan Office Action—16164653.4.

Jul. 26, 2021—European Search Report—EP 16164653.4.

Wikipedia contributors. "User agent." Wikipedia, The Free Encyclopedia. Wikipedia, The Free Encyclopedia, Nov. 26, 2021. Web. Dec. 10, 2021. (Year: 2021).

Yen, Ting-Fang, et al. "Host Fingerprinting and Tracking on the Web: Privacy and Security Implications." N DSS. vol. 62. 2012. (Year: 2012).

Sahu, D., and Deepak Singh Tamar. "End User Identification through Proactive Techniques." International Conference on Information Science (ICIS). 2014. (Year: 2014).

Apr. 20, 2022—Canadian Office Action—CA 2,926,667.

Das, Aveek K., et al. "Characterization of wireless multidevice users." ACM Transactions on Internet Technology (TOIT) 16.4 (2016): 1-25. (Year: 2016).

Jan. 21, 2022—European Office Action—EP 16164653.4.

Nov. 4, 2022—EP Office Action—EP App. No. 16164653.4.

Droms, Dynamic Host Configuration Protocol, Network Working Group RFC 2131, Mar. 1997 (Year: 1997).

"Understanding the Basic Operations of DHCP | Netmanias." Netmanias, Oct. 30, 2013, www.netmanias.com/en/post/techdocs/5998/dhcp-network-protocol/understanding-the-basic-operations-of-dhcp. (Year: 2013).

Wikipedia contributors. "Dynamic Host Configuration Protocol." Wikipedia, The Free Encyclopedia. Wikipedia, The Free Encyclopedia, Oct. 17, 2025. Web. Jan. 8, 2026. (Year: 2025).

U.S. Appl. No. 16/502,965, filed Jul. 3, 2019, Virtual Gateway Control and Management.

* cited by examiner

MEDIA USAGE MONITORING AND CONTROL

This application is a continuation of and claims priority to U.S. application Ser. No. 13/150,981, filed Jun. 1, 2011, the entire contents of which is incorporated herein by reference.

The features described herein relate generally to media content. Some aspects relate to systems and methods for monitoring access to media content across disparate media devices.

BACKGROUND

Historically, radio receivers and televisions were the sole providers of media content for households and other locations, such as for example, schools. Modern households (and other locations) now have several sources of media content. For example, it is not uncommon for a single household to have multiple personal computers (e.g., desktops and/or laptops) which may operate under different operating systems, interactive televisions capable of receiving various types of media, media servers that may access or store media content, as well as additional portable media devices, such as PDA, smart phones, or media players, that can be used remotely from the home.

Having multiple media devices provides an ability to receive (and transmit) vast amounts of media content. Thus, certain individuals, especially children, may spend several hours a day accessing media from several devices. For example, a child may spend two hours watching broadcast television programming, one hour watching interactive media content from a media server, and then spend another hour on a computer or playing games on a video game console. In this regard, it is unlikely that each media device is configurable to have parental control mechanisms. Further, even if a parent or guardian properly configures parental controls for a media device, such as for example, a television configured to display multimedia content, a child may bypass such controls by accessing media content on any other media device, such as for example, a portable media device or computer. To further aggravate this problem, presently available usage monitoring and control systems may be restricted to individual media devices and do not aggregate and converge usage restrictions across media content type and/or across disparate media device types.

Therefore, there is a need in the art for improved systems and methods for monitoring access to various types of media content across disparate media devices.

SUMMARY

Aspects of this disclosure relate to systems and methods for monitoring the access of media content by one or more users. Further aspects relate to systems and methods that may be implemented to control access to media content. Still further aspects relate to aggregating media usage or control rules across disparate media types. Yet still further aspects relate to aggregating media usage or control rules across disparate electronic devices. These and other aspects are discussed below in relation to illustrative embodiments, which serve to provide the reader with an understanding of the various aspects, but do no limit this overall disclosure.

In accordance with one embodiment, usage control rules regarding usage parameters for several users may be received. The usage control rules may define usage parameters of a user for several disparate media devices. Further embodiments are directed towards the construction of such usage control rules. For example, an individual (such as a parent or guardian) may provide instructions utilized to construct one or more rules. The instructions may be received from user inputs provided to a graphical user interface accessible from one or more of the disparate media devices. According to various embodiments, the usage control rules may comprise several individual components, including one or more of: a device rule, a media content rule, a media usage rule, and/or a media type rule. Exemplary rules are explained below in the Detailed Description.

In accordance with various embodiments, a request to access media content may be received via a user input received at one of the plurality of disparate media devices. In response, usage control rules may be applied against stored usage data for that user to determine if they are permitted to access the requested media content. Authentication of the user requesting access the media content may be required. In certain embodiments, a memory comprising a security key may be required to be operatively connected to the disparate media device for media content to be accessed. An exemplary security key may have an interface that is configured to operatively connect with a corresponding interface of at least two of the disparate media devices, so as to enable its connection with a plurality of media devices. The security key may comprise a non-transitory memory configured to store one or more usage control rules and/or usage data regarding aspects of the media content accessed by the user. Other removable memories, in addition to or in lieu of any security key, may be used to store rules and/or usage data.

In certain embodiments, permitting or determining that a user is permitted to access media content may result in storing additional usage data regarding the media permitted to be accessed. In one such embodiment, usage data may be utilized in conjunction with the convergence of device and/or media usage rules. For example, certain implementations may monitor the usage data to determine if the user's usage of the disparate devices violates the rules. In further embodiments, a determination that the user has violated at least one of the media usage rules may result in transmittal of a notification to a third party. The notification may comprise information regarding the violation, including which rule was violated and/or information regarding the media content accessed by the user. The notification may further comprise information, including for example, a link that allows the recipient of the notification to override one or more rules, thus permitting the requesting user to access media content blocked in accordance with the applicable rules.

Further embodiments may detect a new disparate media device. For example, in one embodiment, a gateway device may detect communications with a new media device in a network. In certain embodiments, at least a portion of requested media content directed toward the new disparate device may be blocked.

Aspects of the embodiments may be provided in a non-transitory computer-readable medium having computer-executable instructions to perform one or more of the process steps described herein. Other details and features will also be described in the sections that follow. This summary is not intended to identify critical or essential features of the inventions claimed herein, but instead merely summarizes certain features and variations thereof.

BRIEF DESCRIPTION

Some features herein are illustrated by way of example, and not by way of limitation, in the figures of the accompanying drawings and in which like reference numerals refer to similar elements.

DETAILED DESCRIPTION

In accordance with various aspects of the embodiments, methods, computer-readable media, and apparatuses are disclosed that assist in the creation, implementation, monitoring, review, and control of access rights for various users across different media types and/or media devices.

Figure 1:
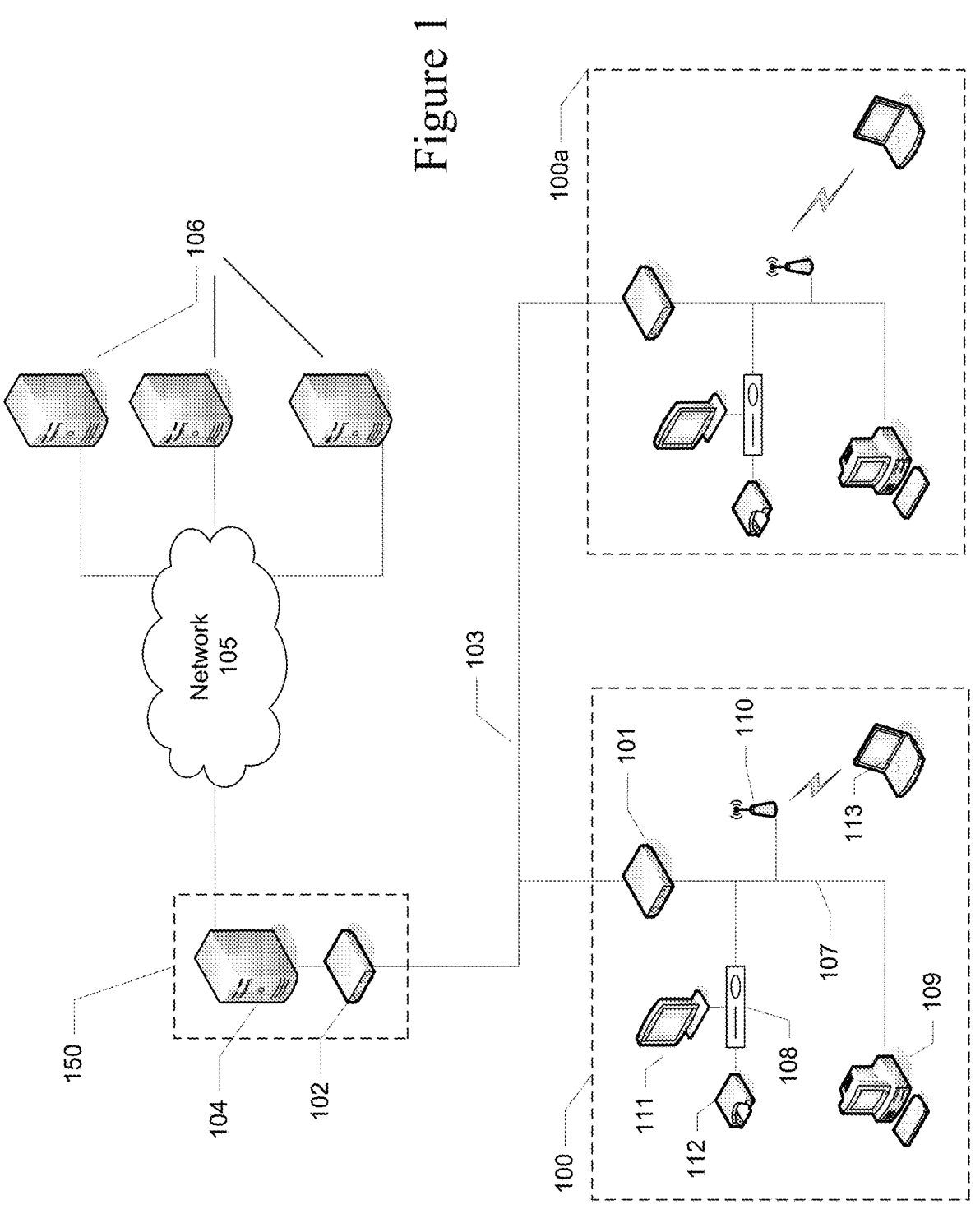
FIG. 1 illustrates an example content distribution network in accordance with an aspect of the disclosure.

FIG. 1 illustrates an example content distribution network that may be used to access various types of information, such as data, video content (movies, pay-per-view, etc.), audio content, Internet or other network, etc., in accordance with an aspect of the disclosure. Starting with a location, which may be a user's home 100 (or any other location), the user may have a network interface device such as a gateway 101. Gateway 101 may be a device (such as a coaxial cable modem, optical fiber modem, wireless device, etc.) that is configured to communicate with another corresponding device 102 via intermediate communication links 103. The nature of the devices 101/102 may depend on the type of communication links 103 being used. For example, links 103 may be coaxial cables, in which case the modems 101/102 may be a coaxial cable modem and a cable modem termination server, respectively. Other types of links may be used as well, such as wireless links, optical lines, hybrid fiber/coaxial cable, satellite, cellular telephone, local wireless WIMAX, etc., and different corresponding types of interface devices 101/102 may be used. Those skilled in the art will appreciate that links 103 may be used to distribute media content to other locations, such as location 100a, which may also have a plurality of media content devices.

In certain embodiments, a device, such as device 102, may be located external to the home 100, such as at a service provider's headend or central office 150. Device 102 may communicate with one or more other servers 104, which may in turn be connected to an even larger communication network 105. Communication network 105 may be any desired type of network, such as a wide area network (WAN), cellular telephone, satellite network, Internet, intranet, etc., and may offer connection to even more servers 106. Those other servers 106 may, in turn, provide various types of services such as delivery of media content, shopping, etc.

In an embodiment, data corresponding to services may be transmitted and received from device 102 or central office 150. Data may include broadcast data (e.g. television broadcast programming), narrowcast data (e.g., VOD and switched digital video (SDV) programming) and unicast data (e.g., high speed data (HSD) service providing Internet connectivity to users and VoIP or other type of telephone service). The backbone network may be, e.g., a service provider's national IP network, the Internet, and/or a combination of the Internet and a service operator's network. Therefore, as would be understood by a person of ordinary skill in the art, one or more users at locations 100 and 100a may simultaneously access different media content through one or more different media devices.

Within home 100, gateway 101 may allow any device in the home to access device 102 and, in turn, any of the other servers 104/106 and network 105. To provide this connectivity, gateway 101 may be connected to one or more in-home communication networks 107 (e.g., in-home coaxial cable, wireless, optical fiber, MoCA (Multimedia Over Coax Alliance), Ethernet, power line network, etc.). Other devices, such as a media interface device 108 (e.g., set-top box, digital video recorder, mobile television, television, computer, mobile telephone, etc.) may also be utilized in accordance with various implementations. Indeed, any device which is configured to access or receive media content is within the scope of this disclosure. Further devices which may be configured to receive media content in accordance with various embodiments may include, for example, computer 109, and/or wireless access point 110 which may permit connectivity to wireless computer 113. In some embodiments, a home may have multiple gateways, and in other embodiments, some or all of the gateways may be integrated into the various devices described herein. So, for example, video interface device 108 may include gateway 101, but to simplify the present discussion, FIG. 1 discusses media interface device 108 and gateway 101 separately.

The in-home devices may use gateway 101 for any variety of purposes, such as accessing the Internet, accessing servers 106, etc. Some devices, such as media interface device 108, may use gateway 101 to receive media content that is then displayed on a display device such as a television, mobile device, or computer monitor 111. As discussed in more detail below, one or more devices, such as media interface device may comprise interface 112 to allow the operative but removable connection of a memory.

Media interface device 108, computer 109, wireless computer 113, display 111 and/or other media devices may be disparate devices that are configured to utilize different protocols and processes to access media content that differ from another media device. For example, media interface device 108 may be a set-top box configured to receive media in MPEG-2 format. Display 111 may be an interactive display device comprising a network connection through gateway 101 independent of media interface device 108. In one embodiment, display 111 may directly receive media content in a format different than received from media interface device 108 and then viewable on display 111. For example, display 111 may be configured to receive video data through the TCP/IP protocol or another protocol. Similarly, computer 109 and/or wireless computer 113 may allow various users to navigate (such as with a software browser) to an HTTP site and download, stream, or otherwise access media content. In this regard, computer 109 and/or wireless computer 113 may operate totally independently of media interface device 108. Thus, in certain embodiments, media interface device 108 may not be required to be present or powered on for the functionality of display 111, computer 109 or wireless computer 113. In fact, in certain embodiments, even if media interface device 108 is powered on, it would have no effect on the usage of computer 109 or wireless computer 113. In this regard, usage of computer 109, wireless computer 113, and/or media interface device 108 cannot be universally monitored or controlled under prior art systems and methods.

Figure 2:
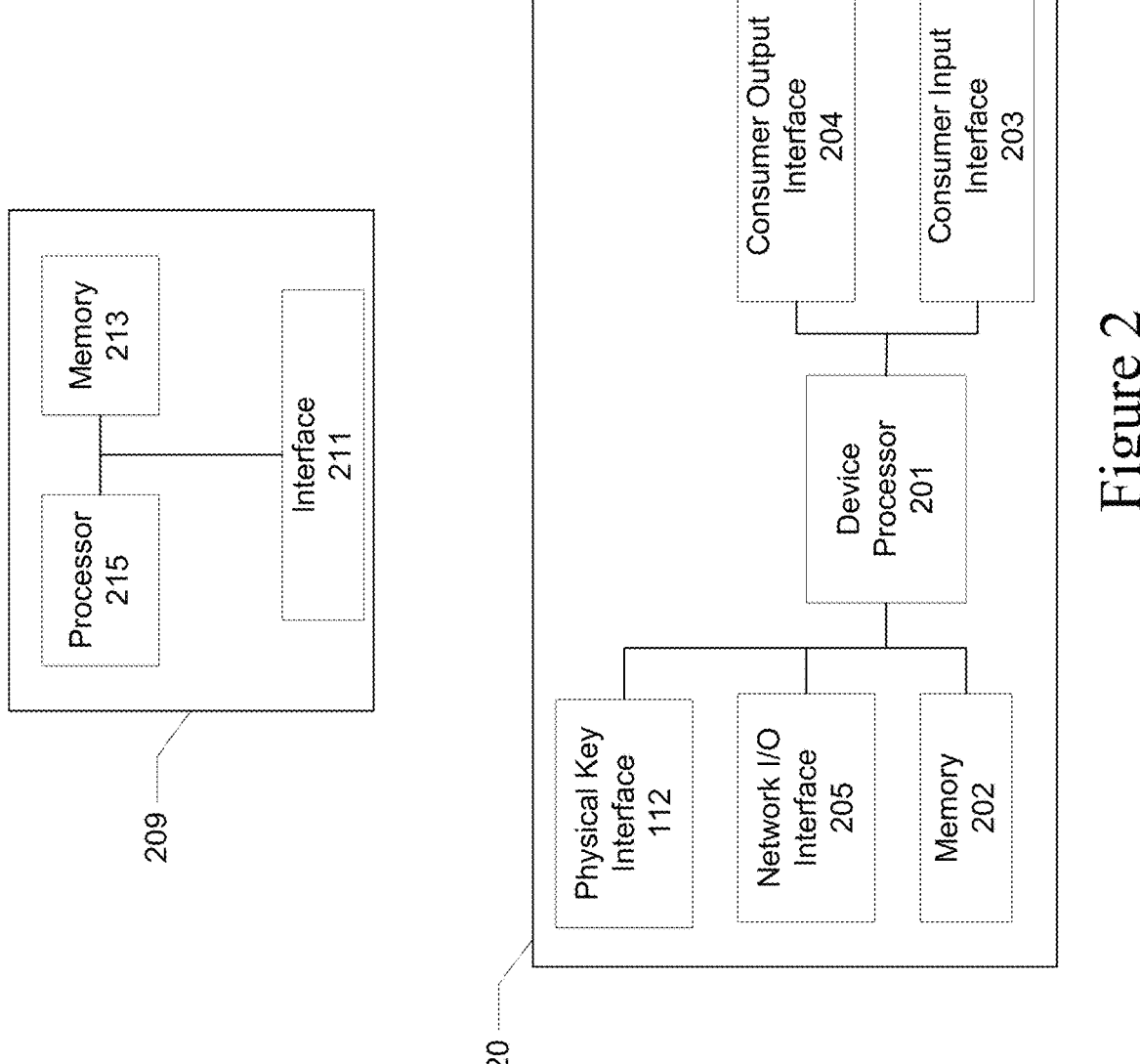
FIG. 2 illustrates an example content access device in communication with a service provider system in accordance with an aspect of the disclosure.

Exemplary components of an illustrative media device, such as one or more of media interface device 108, computer 109, wireless computer 113, display 111 are shown in FIG. 2 as device 220. Those skilled in the art will readily appreciate that the components shown and described in relation to FIG. 2 are merely illustrative and that more or fewer components may be present in one or more disparate media devices. Device 220 may include one or more processors 201. Processor 201 may be general purpose or application specific, and may be configured to execute software instructions that are stored on a non-transitory computer-readable memory 202 to cause the device 108 to perform any of the features described herein. Memory 202 may be any desired type of computer-readable medium, such as one or more hard drives, magnetic and/or optical disk drives, FLASH memory, etc. Memory 202 may store one or more computer-executable instructions that when executed by a processor, such as processor 201, execute methods disclosed herein.

Figure 3:
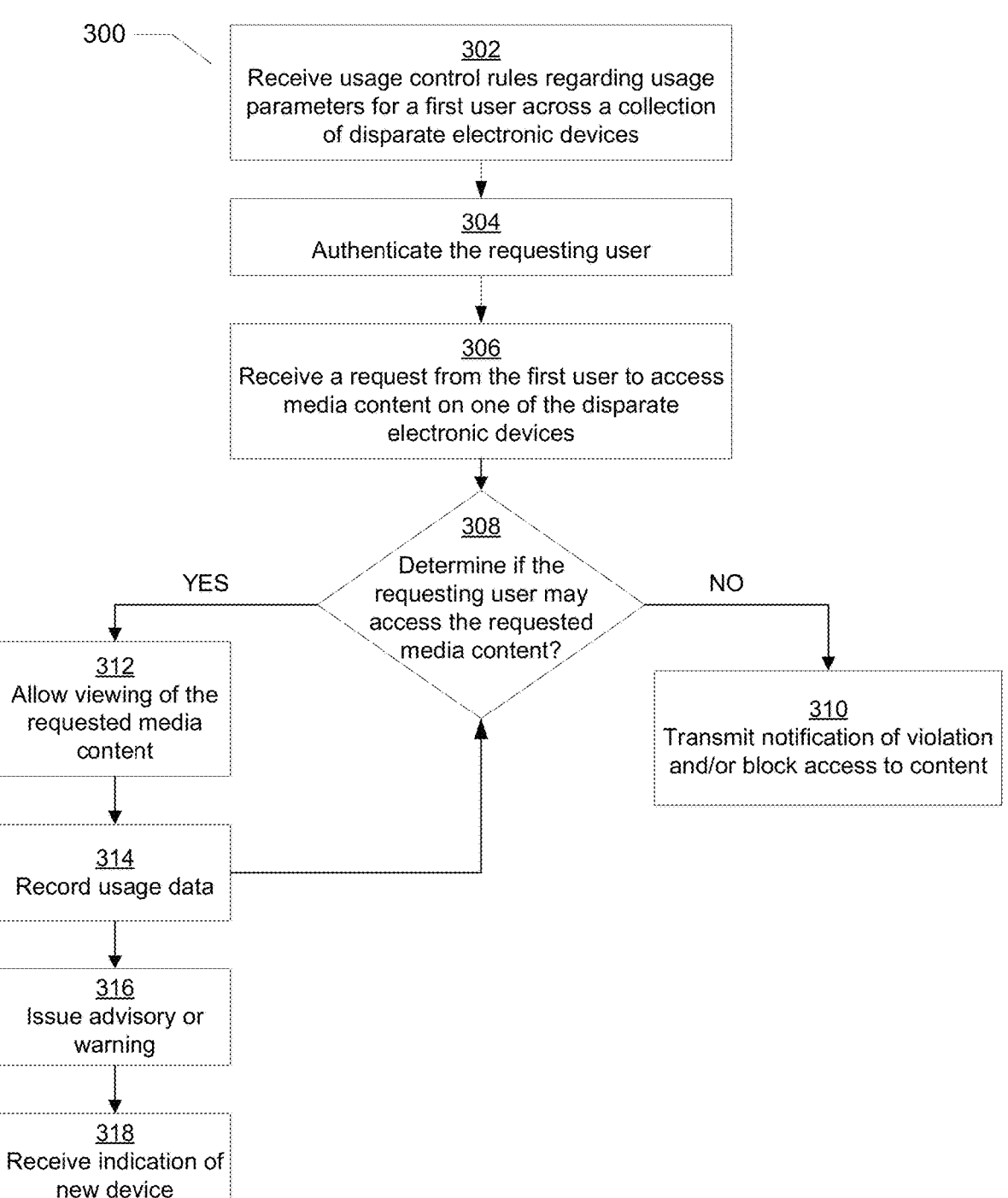
FIG. 3 is an exemplary flowchart showing a method in accordance with an aspect of the disclosure.

Turning briefly to FIG. 3, flowchart 300 shows an exemplary method in accordance with various embodiments. One or more portions of flowchart 300 may be implemented in applying media usage or control rules across disparate media types and/or devices. In one embodiment, step 302 may be implemented to receive rules regarding usage control parameters for a first user across a collection of disparate media devices. In one embodiment, usage parameters may be associated with a user account. Depending on the embodiment, a first user may comprise a group or collection of individuals associated with a first account, such as members of a family, or employees of a business. Indeed, any group or collection of individuals may be a user in accordance with various embodiments. Yet in other embodiments, a user account may be associated with a single user. For example, each family member or person in a household may have their own user account. In certain embodiments, a user, such as a parent or a guardian of a child or minor at a location, may use one or more of the disparate media devices to provide the usage control rules. For example, in one embodiment, processor 201 of media interface device 108 may receive inputs and commands from a user via one or more user input interfaces 203. A wide variety of user input interfaces 203 may be used. For example, the user input interface 203 may include an infrared receiver circuit, configured to receive inputs from a handheld infrared remote control. The input interface 203 may include one or more pushbuttons physically located on a chassis of the device 108. Other user input interfaces may include keyboards, mice, touch pads, microphones, trackballs, and optical devices, such as cameras. Thus, in certain embodiments, a user may provide inputs directly into one of the disparate media devices that affect another individual's access of media content across one or more of the disparate media devices.

Processor 201 may also provide outputs to an individual via one or more output user interfaces 204. Any desired type of output user interface can be used. For example, the output interface 204 may include a video signal interface (e.g., HDMI—High Definition Multimedia Interface video, analog/component/composite video, VGA—Video Graphics Adapter, DVI—Digital Video Interface, etc.), audio signal interface (e.g., multiple audio channel output lines, piezoelectric buzzers, etc.), wireless output (may be combined with wireless user input interface 203 as well). In one embodiment, a display, such as display 111, may output audiovisual information from any of the media devices, including for example, media interface device 108.

Figure 4:
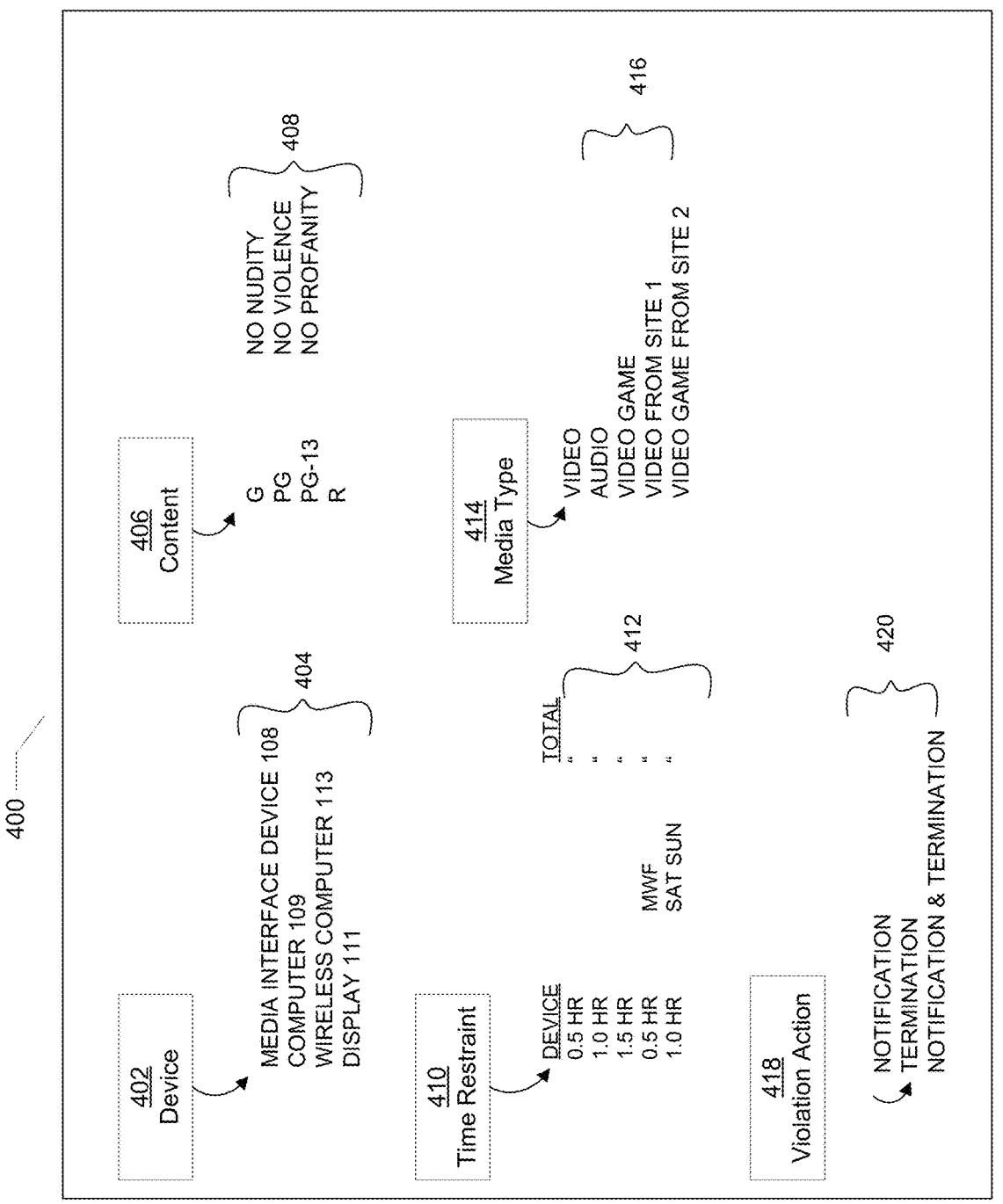
FIG. 4 is an exemplary graphical user interface that may be implemented in accordance with an aspect of the disclosure.

FIG. 4 shows an exemplary graphical user interface ("GUI") 400 that may be provided on a display, such as display 111, to allow a user to input one or more usage control rules. It is to be understood that the exemplary rules discussed herein are merely exemplary and that the reader is advised that any usage control rules may comprise a combination of individual rules. For example, some individual rules that may form the usage control rules are described below and may include, for example, device rules, content rules, media usage rules, media type rules and combinations thereof. Examples of these various rules will now be provided.

A device rule (e.g. "Device Rule 1"), for example, may allow a user to set restrictions, including but not limited to, content rules, media type rules, and/or media usage rules, in regard to a specific device or groups of devices. For example, a parent or guardian may desire to limit the reception of certain media content on a first device, such as wireless computer 113, which may be a gaming console. The parent or guardian, however, may not wish to apply the same restrictions on another device such as computer 109, which may be commonly used to perform school work or is in a general family area that may be monitored. Therefore, Device Rule 1 may be configured to provide further restrictions for that particular user on specific devices, such as computer 113 without affecting (or at least to the same extent) usage of another device by the same user. However, as will be discussed immediately below, other rules may be combined with device rules or other rules, for example, to create further limitations.

Certain aspects disclosed herein relate to providing a graphical user interface (GUI) that allows a parent or guardian to readily apply one or more rules, including device rules, to various user accounts. Looking to exemplary GUI 400 of FIG. 4, a user input may be received from a user input device. For example, a received user input may be configured to select icon 402 labeled "DEVICE" and choose among exemplary choices 404 to initiate establishing a device rule for one or more of the disparate or similar media devices. Upon selecting one or more devices from choices 404, certain embodiments may permit the user to set other restrictions for that device, such as content restrictions with icon 406 to establish a content rule. Content (or any other) rules, however, may apply to all disparate media devices chosen absent a device rule to the contrary. For example, usage control rules may be similar to:

Rule Set #1:

DEVICE #1=Device Rule 1 AND Content Rule 1; DEVICE #2=Device Rule 2 AND Content Rule 2

Rule Set #2:

Content Rule 1

Therefore, under the first exemplary usage control rule (Rule Set #1), application of the use of Device Rule 1 results in "Content Rule 1" being applied to "DEVICE #1" and use of Device Rule 2 results in "Content Rule 2" applied to "DEVICE #2". For example, this rule may be implemented to create a usage rule where a first device, such as media interface device 108, may view PG-13 video content, however, a second device, such as wireless computer 113, may only view or play media content rated PG or G. Conversely, the second usage control rule (Rule Set #2) may not limit the content rule to a specific media device or group of devices. Thus, perhaps every device in the group may view or play PG-13 rated media content. Those skilled in the art with the benefit of this disclosure will appreciate that a usage control rule may have more than one device rule for a given device. For example, one device rule may apply to devices 1-3 while a second device rule applies to devices 2-4, therefore, devices 2 and 3 are affected by each rule. In this regard, a device rule may be a flag or other indicator indicative that a command string applies to certain identified devices, whereas absence of the device rule indicates that a portion of the command string does not apply to that device.

In certain embodiments, a content rule, such as "Content Rule #1" may limit or exclude certain content from being accessed by the user (or, depending on other combinations of rules, a content rule may only apply to a user when using a certain device). Depending on the embodiment, content rules, or any other rule disclosed herein, may be based upon a white-list dictating what content is allowed or a black-list dictating what content is not allowed to be accessed. Looking to exemplary GUI 400, content choices (see, e.g., choices 408) may include ratings, such as G, PG, PG-13 and R. In other embodiments, content rules may exclude certain content, such as violence, regardless of the rating. Those skilled in the art with the benefit of this disclosure will appreciate that any combination of these and/or other criteria may be combined. For example, content rules may be set in which a user may set a first content rule to allow PG rated media content, but allow PG-13 rated material if its content is marked as "educational." Further, as discussed above, content rules may be combined with other rules, including those disclosed herein. For example, a user may be permitted to use media interface device 108 to view any and all G and PG rated materials but may use computer 109 (which may be a gaming console), to access G, PG and PG-13 games and other content. For example, such as rule may be generally expressed as Rule Set #3:

Rule Set #3:

Device #1=Device Rule 1 AND Content Rule 1; Device #2=Device Rule 2 AND Content Rule 3

Yet in further embodiments, rules may be configured to allow a specific user of a group of devices to access G, PG and PG-13 materials unless such materials are accessed on computer 109 and flagged as containing nudity or unless such materials are accessed on wireless computer 113 and contain nudity or violence. Thus, in this regard certain embodiments may create custom content rules, which may include, for example, Rule Set #4:

Rule Set #4:

Content Rule 4 AND (Device #1=Device Rule 1 AND Content Rule 1) AND (Device #2=Device Rule 2 AND Content Rule 3)

Usage rules may dictate when and how the content may be accessed. For example, icon 410 (labeled "Time Restraint") may allow a user to select one or more media usage rules. In one embodiment, a media usage rule may comprise time restraints for one or more different devices. For example, time restraints may monitor and/or limit the amount of time that a particular user or group of users may use a device, group of devices, or utilize specific types of media on one or more devices. As shown in choices 412, exemplary time restraints may apply to one or more specific devices and/or a collection of disparate media devices. Further, the time restraints may vary according to the date. For example, extra time may be allotted on one or more devices to access media content on weekends or holidays. In certain embodiments, access restraints may be further restricted by the content rules. For example, a user may be allotted more time on certain days only in regards to content rated PG or for games having educational content.

Further usage restraints may dictate how the accessed media is used. For example, restraints may be set in regards to whether a user may view, record, or play certain content (such as a game). For example, illustrative usage control rules may include:

Rule Set #5:

Media Usage Rule 1 AND (Media Usage Rule 2 OR Media Usage Rule 3)

Rule Set #6:

Media Usage Rule 1 AND (DEVICE #1=Device Rule 1 AND Media Usage Rule 2 OR Media Usage Rule 3 AND CONTENT RULE 5)

Those skilled in the art with the benefit of this disclosure will appreciate that any restraint regarding the usage of the accessed information is within the scope of this disclosure.

Media type rules may dictate what type of media content may be accessed. For example, icon 414 of exemplary GUI 400 shown in FIG. 4 may allow a user to select one or more media type rules. In one embodiment, a media type rule may comprise categories of media types that may be considered, either alone or in combination with other rules, such as device rules, content rules, or other rules. As shown in choices 416, exemplary categories may comprise "VIDEO," "AUDIO," "VIDEO GAME," "VIDEO FROM SITE 1," or "VIDEO GAME FROM SITE 2." For example, a usage rule may dictate that a user may only view fifteen (15) hours of video and play five (5) hours of video games each week, regardless of what disparate devices are utilized to do so and thus such viewing or playing must be rated PG-13 or lower. An exemplary rule may generally appear with an overall usage control rule as, for example, Rule Set #7:

Rule Set #7:

(Media Type Rule 1 AND Media Usage Rule 2) AND Media Content Rule 1

Those skilled in the art with the benefit of this disclosure will readily appreciate that one or more media type rules may overlap with other rules, such as content rules. Therefore, it should be understood that discussion of different types of rules is to provide examples of specific embodiments, and that the reader is advised that there may be embodiments where a content rule may encompass instructions that are described in relation to media type rules herein.

Icon 418 may be provided to receive a user input regarding actions to be taken if a violation occurred. In certain embodiments, one or more of choices 420 may be executed to provide a notification and/or terminate further access to the media content. As discussed in more detail below in relation to block 310, a notification may be transmitted to the user accessing the information and/or a third party, such as a parent or guardian.

The control rules may be stored across one or more computer-readable media, such as memory 202, or any computer-readable medium, including for example, on gateway 101, corresponding device 102, device 104 or any of servers 106. The determination of which devices are to be monitored and/or presented on GUI 400 (such as described in relation to icon 402) may vary according to certain implementations. In one embodiment, a user may manually select or set up one or more media devices to be monitored. In certain embodiments, one or more of the devices may be electronically detected (either automatically or with assistance by a user input). For example, some embodiments may utilize Universal Plug and Play (UPnP) or other technologies to allow one or more of the disparate media devices to be detected. Generally, UPnP networking is typically based on IP addressing. Certain media devices may have a Dynamic Host Configuration Protocol (DHCP) client and searches for a DHCP server when the device is first connected to the network. If no DHCP (or other type of technology) server is available, a device may assign itself an address. If during the DHCP transaction, a device obtains a domain name through a DNS server or via DNS forwarding, the device may use that name in subsequent network operations; otherwise, the device may use its IP address. In certain embodiments, a discovery protocol may allow a device to advertise its services to control points on the network. Thus, GUI may utilize such information to determine information about one or more of the devices in which a user wishes to monitor.

Further, while icons 402, 406, 410, 414, and 418 are shown as being presented on a single screenshot of GUI 400, those skilled in the art will readily appreciate that the layout and design the exemplary GUI 400 is merely for illustrative purposes to demonstrate an exemplary implementation of receiving inputs from a user, such as within the scope of block 302. Further drop down menus, additional pages, and other mechanisms may be implemented to create the rules. In another embodiment, a user may access a device page. For example, a user may use computer 109 to access a HTTP page accessible on another device, such as gateway 101, to create and modify one or more rules. Yet in further embodiments, GUI 400 may be hosted from remote devices, such as any device in central office 150 and/or from servers 106.

Turning again to FIG. 3, block 304 may be implemented to authenticate a user requesting media content. Authentication may be done through any process using any known system and devices known to those of ordinary skill in the art. Authentication may include the use of a password, biometric data, or any other security feature. In certain embodiments, a user attempting to access media content (or providing authentication before they may obtain media content) may be required to provide a physical security key. For example, in one embodiment, one or more media devices may include a key interface, such as key interface 112. For example, key interface is shown operatively connected to media interface device 108. Key interface 112 may be external or internal to any media device. As shown in FIG. 2, key interface 112 may be configured to operatively connect to physical key 209 through interface 211. In one embodiment, interfaces 209/211 may comprise a Universal Serial Bus (USB) interface. Those skilled in the art will appreciate that any media interface that permits the operative communication of physical key 209 with a device, such as media interface device 208 is within the scope of this disclosure.

Looking to the embodiment shown in FIG. 2, physical key 209 may consist essentially of a memory, such as memory 213. Yet, in other embodiments, physical key 209 comprises memory 213, processor 215 and possibly additional components. Memory 213 may be a read/write memory and may comprise identifying information regarding the user attempting to access media content. In further embodiments, the identifying information may comprise authentication information. In still yet further embodiments, memory 213 may comprise one or more usage rules applied to the user account. In other embodiments, memory 213 may comprise information relating to or regarding aspects of the media content accessed by user ("usage data") during a monitoring period. In certain embodiments, memory 213 may comprise both usage rules and usage data for the user. As discussed above, aspects of this disclosure permit the aggregation of rules across electronic devices and/or media types. In accordance with various implementations, this may be advantageous, for example, to ensure that all usage data is recorded, even for devices that may not be tracked according to one or more usage rules. Further, certain embodiments may be used to monitor and/or restrict access to media content to devices that may not be always connected to a communications network, such as through gateway 101. In certain embodiments, connection of physical key 209 to certain media devices, such as media interface device 108, may permit the access of usage data for collection or analysis in another device, such as gateway 101 or servers 106. Other embodiments, however, may not store any usage data on physical key 209.

Block 306 may be implemented in accordance with certain embodiments to receive a request from the first user to access media content on one of the disparate (and similar) media devices, such as for example, wireless computer 113. As discussed above, connection of physical key 209 may form at least a portion of this request. In another embodiment, the connection of physical key 209 or an input of authentication information at block 304 is merely a prerequisite of receiving a request for media content. In other embodiment, the request may be received through user input interface 203, such as through an infrared receiver circuit configured to receive inputs from a handheld infrared remote control.

In accordance with certain embodiments, the viewing of media program guides (EPGs), menus or the like may not be quantified as viewing media content that would be subtracted from the user's remaining time. In other embodiments, limited viewing such as scrolling or scanning channels may not be considered. For example, memory 202 may comprise computer-executable instructions that when executed by a processor, such as processor 201, initiate a timer that detects when different media, such as a different channel of TV programming, or a different game is loaded or accessed. The timer may permit a predefined amount of media content to be viewed before applying one or more rules. The amount of media content may be measured in units of time or by units of received/transmitted information through a device. In certain embodiments, certain rules will always be applied. For example, if a user attempts to access an R-rated movie in violation of the content rules (for example, rules set through icon 406 of GUI 400), this may always be deemed a restriction. However, accessing various PG-13 rated movies for a few minutes in an attempt to locate media content of interest may not apply one or more time restraint rules (such as set through icon 410 of GUI 400).

At block 308, rules (including, for example, device rules, content rules, media usage rules, media type rules and combinations thereof) may be applied against usage data for the user accessing the media content to determine if the user may access the requested media content. The usage data may be based on the aggregate usage of at least two disparate media devices or media types. If it is determined that the user is not permitted to access the requested media content, block 310 may be implemented. In one embodiment, block 310 may prevent the viewing of the requested content and/or transmitting a notification. The notification may be transmitted to the display device, such as display 111, utilized to attempt to view the requested media content. The notification may indicate that the requested action violates one of the rules. The notification may indicate which rule was violated.

Further embodiments may comprise transmitting a notification to a media device or address associated with a third party, such as a parent or guardian. For example, one or more media signals may be transmitted via gateway 101 to an external location, such as through, for example, optical lines, hybrid fiber/coaxial cable, satellite, cellular telephone, local wireless WIMAX, or any other communication pathways. For example, a user may use GUI 400 to provide an email address or phone number to transmit a notification to indicate the violation. The notification may include an indication that a violation occurred. Other information that may be included in the notification may include, but is not limited to: time of the violation, any content accessed causing the violation, further actions taken on one or more devices following the violation, and combinations thereof. In further embodiments, the notification may include a selectable link or other address that a user may access that provides information regarding media access for one or more user accounts that provides information regarding usage of the devices. In certain embodiments, the third party may override the violation and approve a request that was deemed to violate one or more rules. Transmittal and reception of notifications and related information may occur with or without the knowledge of the user requesting the media content.

If it is determined that the user is permitted to access the requested media content, the requested content may be transmitted or otherwise made accessible for viewing or playing (see, block 312), and usage data regarding aspects of the accessed media content may be recorded (see, block 314). For example, the content, media type, time and duration of the access, and/or the device the media is accessed from may be stored on a tangible, non-transitory computer-readable medium. As discussed above, the usage data may be stored on one or more local or remote computer-readable mediums. Using usage data, a process may be implemented to determine if one or more rules are violated. In certain embodiments, one or more processes of may be similar to one or more processes discussed in relation to block 310. For example, in the illustrated embodiment, block 310 may be conducted to determine whether any violations have occurred.

Further embodiments may issue notifications to provide a warning or advisory that a threshold may be approaching (see, e.g. block 316). For example, a user may have used 4.5 of 5 hours that are allotted for PG-13 rated movies during the weekdays on certain devices, therefore, in accordance with one embodiment, a notification may provide an indication to the user that they only have 0.5 hours left of viewing certain media content having content meeting certain criteria (such as rated PG-13). In another embodiment, a user may not be permitted to view any media content on a device after 9:00 pm; therefore, a notification may be transmitted at 8:30 pm indicating that the user has only 30 minutes of viewing before a violation will occur.

Block 318 may be implemented to receive an indication that a new media device is to monitored, such as a new device being present. In certain embodiments, one or more processes may determine that a new media device has been detected. For example, gateway 101 may detect a new UPnP device or a device assigned an address such as a DHCP address. The detection of media devices may be performed in accordance with any of the processes described herein and/or other processes known to those skilled in the art. In certain embodiments, detection of a media device config-ured to allow the access of media content may trigger a notification. One or more notifications may prompt a user to set usage rules for the device or otherwise incorporate the reception of media content through the new device into the usage rules. The transmission of notifications has been discussed throughout this disclosure and is not repeated here.

In certain embodiments, certain users may not be permit-ted to receive media content with new media devices until the device has been approved by a third party, such as a parent or guardian, or until usage rules for or regarding the device have been established. For example, the detection of a new disparate media device may be made by assignment of an address by a gateway device, such as gateway device 101. In further embodiments, an indication of traffic to a device may serve as detection of a new device. As used in this context, a single housing, such as an interactive televi-sion set may comprise two or more detectable devices. For example, a first device may be a transceiver configured to receive broadcast television services and the second device may be a network interface configured to receive video through the a protocol differing from the protocol delivering broadcast television service, such as the TCP/IP protocol. In certain embodiments, traffic received via gateway 101 directed towards a media device may be blocked. In certain embodiments, only a portion of traffic may be blocked. Blockage may depend on rules set for similar devices. Such enforcement may be performed by computer-executable instructions on a memory located locally, such as on gate-way 101 or remotely, such as on servers 106. Further, those skilled in the art will appreciate that block 318 may occur during, before, or after any process disclosed herein.

Aspects of the embodiments have been described in terms of illustrative embodiments thereof. Numerous other embodiments, modifications and variations within the scope and spirit of the appended claims will occur to persons of ordinary skill in the art from a review of this disclosure. Although example embodiments are described above, the various features and steps may be combined, divided, omit-ted, and/or augmented in any desired manner, depending on the specific secure process desired. For example, one of ordinary skill in the art will appreciate that the steps illus-trated in the illustrative figures may be performed in other than the recited order, and that one or more steps illustrated may be optional in accordance with aspects of the embodi-ments. This patent should not be limited to the example embodiments described, but rather should have its scope determined by the claims that follow.

The invention claimed is:

1. A method comprising:

detecting, by a computing device, a first connection of a first client device to a network associated with the computing device;

causing, by the computing device and based on the detecting the first connection, a set of default rules to be applied to the first connection, wherein the set of default rules indicates whether to permit content to be received by the first client device;

sending, based on the detecting the first connection and to an additional client device, a notification requesting configuration of a profile comprising at least one rule for content accessed by the first client device;

receiving, from the additional client device, the configu-ration associated with a set of rules applied to at least one other device similar to the first client device, wherein the set of rules comprises the at least one rule;

determining, by the computing device, based on the configuration received from the additional client device and based on detecting a network address associated with the first client device, and after the detecting the first connection associated with the first client device at a first location, the profile, comprising the at least one rule, that is associated with the first client device;

causing, by the computing device and based on the profile, the at least one rule to be applied to the first connection;

detecting, by the computing device, a second connection associated with a second client device at a second location;

determining, by the computing device, that the profile is associated with the second client device; and causing, by the computing device, based on the profile, and by aggregating activity on the first connection and the second connection, the at least one rule to be applied to the second connection.

2. The method of claim 1, wherein the at least one rule denies access to mature content, and wherein the method further comprises:

granting, based on a user input indicating the at least one rule should be overridden, a first request to send, via the first connection, a first content item comprising mature content; and granting, based on the at least one rule, a second request to send, via the second connection, a second content item comprising mature content.

3. The method of claim 1, wherein the at least one rule denies access to mature content, and wherein the method further comprises:

denying, based on the at least one rule, a first request to send, via the first connection, a first content item comprising mature content; and denying, based on the at least one rule, a second request to send, via the second connection, a second content item comprising mature content.

4. The method of claim 1, wherein the method further comprises:

granting, based on a threshold time limit of the at least one rule exceeding a usage time of the first client device, a first request to send, via the first connection, a first content item; and denying, based on an updated usage time of the first client device exceeding the threshold time limit of the at least one rule, a second request to send, via the second connection, a second content item.

5. The method of claim 1, wherein the at least one rule denies access to content of a first type, and wherein the method further comprises:

denying, based on the at least one rule, a first request to send, via the first connection, a first content item of the first type; and granting, based on the at least one rule, a second request to send, via the second connection, a second content item of a second type.

6. The method of claim 1, wherein the network address comprises an address assigned using dynamic host configuration protocol (DHCP).

7. The method of claim 1, further comprising causing output of a web-based interface displayed via an additional client device, wherein the web-based interface comprises an option to trigger a user prompt to override the at least one rule.

8. The method of claim 1, further comprising associating, based on an authentication, the profile with the first client device, wherein the authentication comprises receiving authenticating information received via an interface.

9. The method of claim 1, wherein the determining the profile comprises determining, based on a domain name associated with the network address, the profile.

10. The method of claim 1, wherein the at least one rule comprises a threshold time limit for using the first client device, wherein user interface usage does not apply to the threshold time limit, and wherein the user interface usage comprises usage of at least one of:

an electronic program guide, or a menu.

11. The method of claim 1, wherein the at least one rule comprises a threshold time limit for using the first client device, and further comprising determining the threshold time limit based on aggregating:

a first time limit for a first content type, and a second time limit, different from the first time limit, for a second content type.

12. The method of claim 1, wherein the profile indicates:

a first time limit for viewing video; and a second time limit for playing a video game.

13. The method of claim 1, wherein the at least one rule comprises a threshold time limit for using the first client device, and further comprising determining the threshold time limit based on aggregating:

a first time limit for mature content; and a second time limit for one or more video games.

14. The method of claim 1, further comprising determining to send the notification based on detecting that the first client device is configured to allow access of media content.

15. A method comprising:

detecting, by a computing device, a first connection of a client device to a network associated with the computing device;

causing, by the computing device and based on the detecting the first connection, a set of default rules to be applied to the first connection, wherein the set of default rules indicates whether to permit content to be received by the client device;

sending, based on the detecting the first connection and to an additional client device, a notification requesting configuration of a profile comprising a first rule for content accessed by the client device;

receiving, from the additional client device, and based on a user input via an interface, the configuration comprising a plurality of device rules corresponding to a plurality of devices similar to the client device, wherein the plurality of device rules comprises the first rule, and wherein the first rule comprises a threshold time limit;

determining, by the computing device, based on the configuration received from the additional client device, and based on detecting a network address associated with the client device, and after the detecting the first connection associated with the client device at a first location, that the first rule is associated with the client device;

causing, by the computing device, the first rule to be applied to the first connection;

causing, by the computing device and based on determining a second connection to the client device at a second location, the first rule to be applied to the second connection; and aggregating, by the computing device, data associated with applying the first rule to the first connection and to the second connection.

16. The method of claim 15, wherein the first rule denies access to mature content, and wherein the method further comprises:

granting, based on a user input indicating the first rule should be overridden, a first request to send, via the first connection, a first content item comprising mature content; and granting, based on the first rule, a second request to send, via the second connection, a second content item comprising mature content.

17. The method of claim 15, wherein the first rule denies access to mature content, and wherein the method further comprises:

denying, based on the first rule, a first request to send, via the first connection, a first content item comprising mature content; and denying, based on the first rule, a second request to send, via the second connection, a second content item comprising mature content.

18. The method of claim 15, wherein the method further comprises:

granting, based on the threshold time limit of the first rule exceeding a usage time of the client device, a first request to send, via the first connection, a first content item; and denying, based on an updated usage time of the client device exceeding the threshold time limit of the first rule, a second request to send, via the second connection, a second content item.

19. The method of claim 15, further comprising associating, based on an authentication, the first rule with the client device, wherein the authentication comprises receiving authenticating information received via an additional interface.

20. A method comprising:

detecting, by a computing device, a first connection of a client device to a network associated with the computing device;

determining, by the computing device, based on the detecting, and based on determining the client device is similar to at least one other device, a set of default rules, wherein the set of default rules indicates whether to permit content to be received by the client device;

causing, by the computing device and based on the determining the default rules, the set of default rules to be applied to the first connection;

sending, to an additional client device, based on the detecting the first connection, a notification requesting configuration of a profile comprising a first rule for content accessed by the client device;

receiving, from the additional client device and based on a user input via an interface, the configuration for the first rule comprising a threshold time limit;

determining, by the computing device, based on the configuration received from the additional client device and based on detecting a network address associated with the client device, and after the detecting the first connection associated with the client device at a first location, that the first rule is associated with the client device;

causing, by the computing device, a user prompt requesting an authentication for suspending the first rule, wherein the user prompt comprises a selectable link for providing the authentication;

causing, based on receiving the authentication, the first rule to be suspended;

granting, by the computing device and based on the causing the first rule to be suspended, a first request to send a first content item via the first connection;

determining, by the computing device, a second connection associated with the client device at a second location; and granting, by the computing device and based on determining that an aggregation of the first request and a second request conforms to the first rule, the second request, wherein the second request comprises a request to send a second content item.

21. The method of claim 20, further comprising:

sending, to the client device and after granting the first request, the first content item; and sending, to the client device and after granting the second request, the second content item.

22. The method of claim 20, wherein the first rule comprises a time threshold for using the client device, and wherein the aggregation comprises a combination of a first time for the first request and a second time for the second request.

* * * * *